United States Patent Office 3,385,339
Patented May 28, 1968

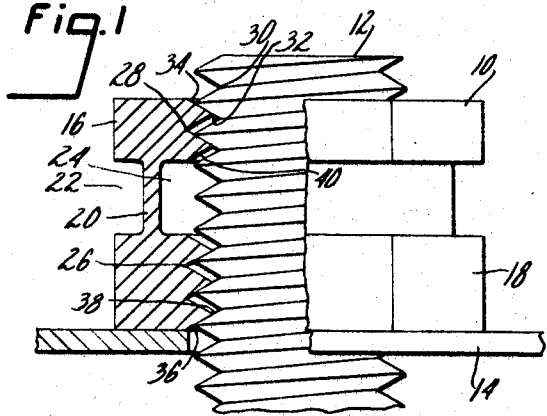
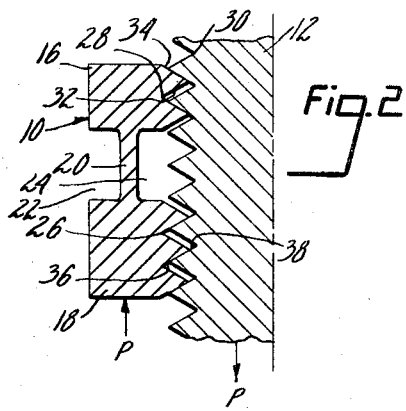
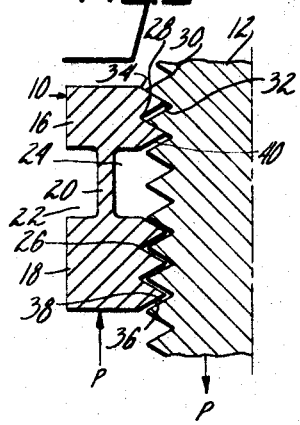
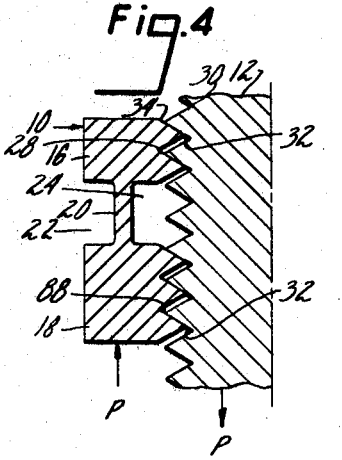
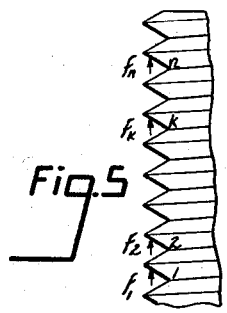
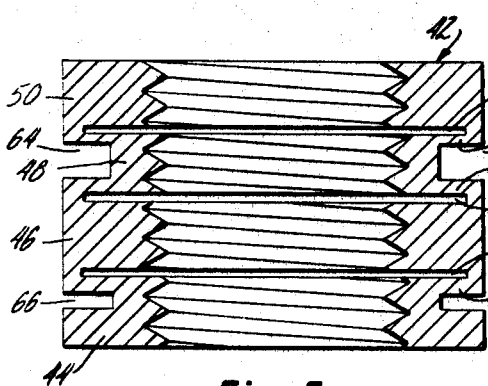
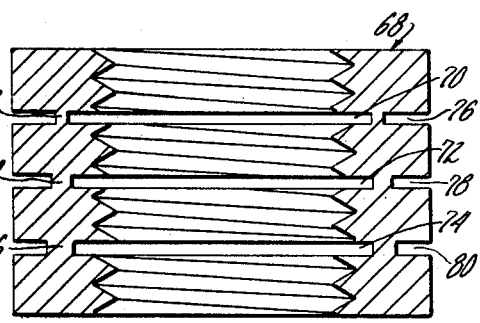

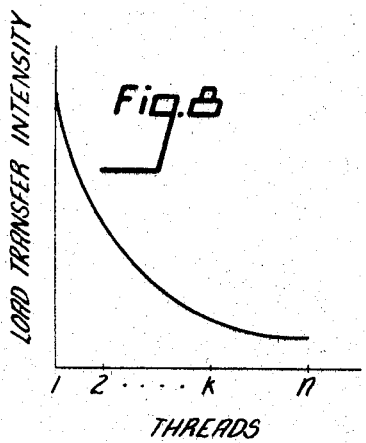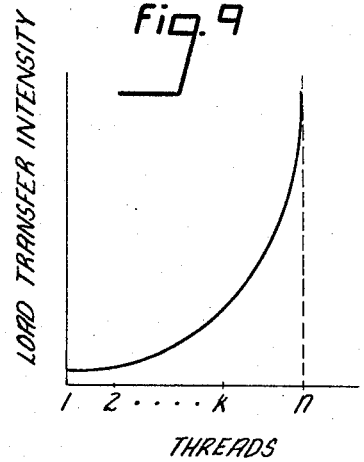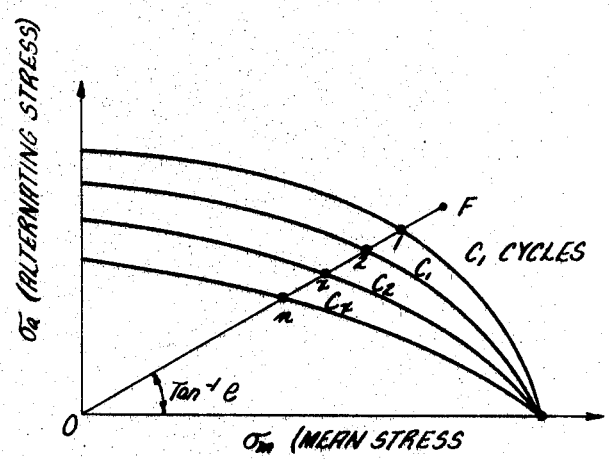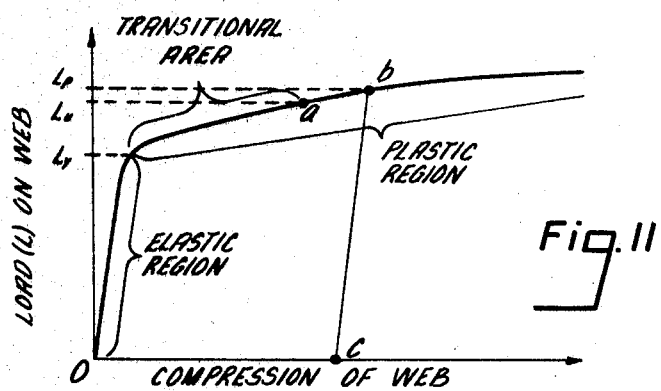

3,385,339
PLASTIC ACTION FATIGUE RESISTANT NUT
Norman Christian Dahl, 40 Fern St.,
Lexington, Mass. 02173
Continuation-in-part of application Ser. No. 501,902,
Oct. 22, 1965. This application July 7, 1967, Ser.
No. 659,831
10 Claims. (Cl. 151—21)

ABSTRACT OF THE DISCLOSURE

A nut having two adjacent, axially spaced, internally threaded sections which are connected by an integrally formed web. One threaded section is displaced apart and out of phase with the other section. When the nut is engaged with a bolt, the leading faces of the first section of the nut engage the lagging faces of the bolt threads, while the lagging faces of the second section engage the leading faces of the bolt threads. When the nut is loaded, the web plastically deforms and the thread engagement of the first section with the bolt is the same as the second section thereby redistributing the load transfer intensity

*Cross reference to related application*

This is a continuation-in-part of my copending application, Ser. No. 501,902, filed Oct. 22, 1965, now abandoned.

This invention relates to fatigue resistant nuts.

It has been found that the ordinary nut and bolt unit will frequently fail due to metal fatigue of the bolt. Most often the failure of the bolt will occur at the bolt threads which are at the end of the nut closest to the application of the load. The type of failure here relevant is that due to repeated stressings over a period of time, not a single overloading. When the load is transferred from a bolt to a nut in the usual way (bolt in tension, nut in compression) the transfer occurs in a non-uniform manner along the thread engagement between the nut and bolt. The load transfer will be maximum at the first engaged thread in the direction of the load and decrease, but not linearly, to a minimum at the last engaged thread.

It is a primary object of the invention to provide a fatigue resistant nut which will substantially improve the fatigue life of the nut-bolt combination in which it is used.

It is a further object of the invention to provide a fatigue resistant nut which will effect a close approximation to the ideal load transfer intensity distribution between the threads of the nut and an associated bolt, a distribution which will make fatigue failure of the bolt equally likely to occur at all points along the length of the bolt thread in engagement with the nut and thus use the potential strength of the nut-bolt combination in the most efficient manner.

A further object of the invention is to provide a fatigue resistant nut in which the load transfer intensity distribution is substantially reversed from that which occurs in an ordinary nut and bolt relation.

A further object of the invention is to provide a fatigue resistant nut which will conform itself to meet a particular set of conditions in its initial loading cycle in the plastic region and thereafter respond elastically to similar loads.

A further object of the invention is to provide a fatigue resistant nut which is simple in design and inexpensive to manufacture.

The invention features a nut comprising at least one pair of adjacent, axially spaced, internally threaded sections connected by a web, the threads of one of said sections being displaced apart and out of phase with the threads of the other by more than either the threads clearance (backlash) or the yield displacement of the web but less than the thread clearance plus one-half of the thread pitch, said sections and web being integrally formed, said web being designed to deform plastically to adjust to said bolt and load conditions during its initial loading cycle, thereafter responding elastically to cycles of similar load conditions.

Other objects, features and advantages will appear from the following description of a preferred embodiment of the invention, taken with the attached drawings in which:

FIG. 1 is partial sectional view of one embodiment of the invention showing a nut of the invention threaded on a bolt but not tightened;

FIG. 2 is a sectional view of a portion of the threads shown in FIG. 1 under initial tightening of the nut on the bolt;

FIG. 3 is a sectional view of a portion of the threads shown in FIG. 1 under further (transitional) tightening of the nut;

FIG. 4 is a sectional view of a portion of the threads shown in FIG. 1 under final tightening of the nut and under subsequent load conditions;

FIG. 5 is an enlarged sectional view of the bolt threads shown in FIG. 1;

FIG. 6 is a sectional view of another embodiment of the invention;

FIG. 7 is a sectional view of a third embodiment of the invention;

FIG. 8 is a graph representing the load transfer intensity distribution in an ordinary nut and bolt unit;

FIG. 9 is a similar representation of the ideal load transfer intensity distribution in a nut and bolt unit in accordance with the invention;

FIG. 10 shows the correlation between means stress and alternating stress and fatigue life for common materials from which bolts are manufactured;

FIG. 11 is a graph illustrating the elastic and plastic behavior of the web in the nut of the invention;

Figure 12:
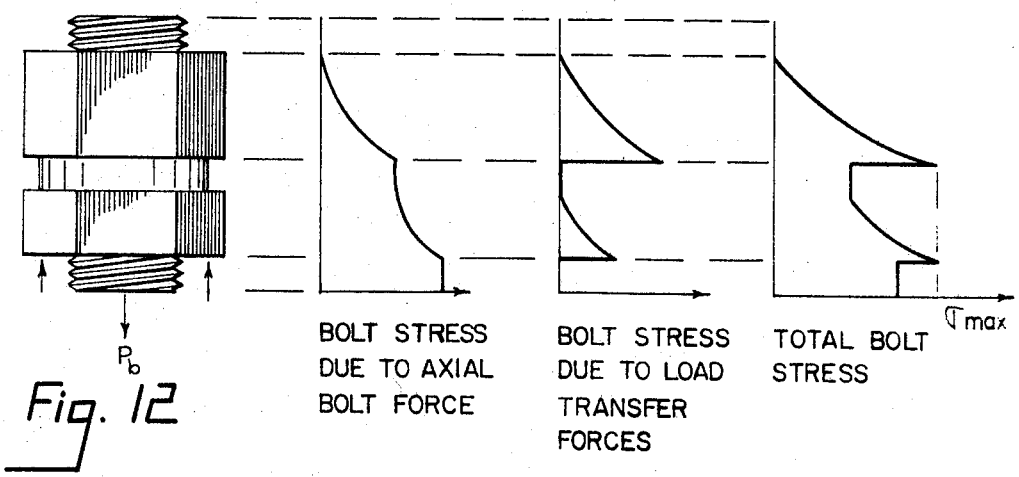
FIG. 12 is a diagram illustrating stress distribution in a bolt using a nut of the invention.

Referring to the drawings, there is shown in FIG. 8 an indication of the load transfer intensity distribution between the threads of an ordinary nut and bolt combination. The load transfer intensity between each thread of the nut and its corresponding bolt thread decreases non-linearly as the distance of the thread from the direction of the load increases. Thus, the $n$th thread (in FIG. 5) will transfer less load than the first.

If a metal is stressed (stress being the load per unit area) repeatedly with various combinations of mean stress $\sigma_m$, and alternating stress $\sigma_a$, the maximum stress being $(\sigma_m + \sigma_a)$ and the minimum stress being $(\sigma_m - \sigma_a)$, the combinations of these quantities rendering equal fatigue life will be as shown in FIG. 10. Alternating stress is plotted along the ordinate and mean stress along the abscissa. The curves $C_1$, $C_2$, $C_x$ and $C_n$ represent the combinations of means stress and alternating stress which give equal fatigue life (equal number of cycles of alternating stress before failure), where $C_1$ is the lowest number of cycles and $C_n$ is the highest. These curves are constructed by applying a fixed mean stress to a specimen and then repeatedly subjecting it to a given alternating stress until it fractures, and then repeating the test for different combinations of stress.

A better understanding of the problem may be had by subjecting a nut and bolt combination to a varying loading condition such that the load in the bolt is:

$$P = P_m \pm P_a \quad (I)$$
$$P = P_m(l \pm e) \quad (II)$$

where $P_m$ = mean load
$P_a$ = alternating load  (III)
$e = P_a/P_m$

With the nut and bolt combination behaving elastically the intensity of the load transfer at the $k$th thread in FIG. 5 will be $$F_k = F_{km} \pm F_{ka}$$
$$= F_{km}(l \pm e) \quad (IV)$$

where $F_{km}$ = mean load transfer intensity at bolt thread $k$
$F_{ka}$ = alternating load transfer intensity at bolt thread $k$  (V)

and the tensile force in the bolt at the $k$th thread $P_k$ will be $$P_k = P_{km} \pm P_{ka}$$
$$= P_{km}(l \pm e) \quad (VI)$$

where $P_{km}$ = mean tensile force at bolt thread $k$
$P_{ka}$ = alternating tensile force at bolt thread $k$  (VII)

In general, the effective fatigue stress at the root of the $k$th thread of the bolt is represented by the sum of the stress due to the tensile force and the stress due to the load transfer intensity as follows:

$$\sigma_k = \alpha P_k + \beta F_k - \gamma F_{k-1} (k=2, \ldots n) \quad (VIII)$$

where $\alpha$, $\beta$ and $\gamma$ include the effect of stress concentrations. The third quantity in (VIII) is absent for the thread engaged closest to the direction of the force, thread 1 in FIG. 5, thus, $$\sigma_1 = \alpha P_1 + \beta F_1 (k=1) \quad (IX)$$

Combining the expressions of (IV) and (VI) the mean stress and alternating stress can be expressed in the form $$(\sigma_{km} \pm \sigma_{ka}) = (\alpha P_{km} + \beta F_{km} - \gamma F(k-1)_m)(l \pm e)$$
$$(k=2, \ldots n) \quad (X)$$
$$(\sigma_{lm} \pm \sigma_{la}) = (\alpha P_{lm} + \beta F_{lm})(l \pm e)(k=1)$$

It is apparent from (X) that all the alternating and mean stress components will be in the ratio of $e$, represented by points along line OF of FIG. 10.

Since all values of $\sigma_a$ and $\sigma_m$ must be along line OF of FIG. 10, calculations of $\sigma_a$ and $\sigma_m$ combinations for threads 1, 2, 3 . . . $n$ of FIG. 5 will also be on line OF. When such calculations are made it will be noted that point 1, corresponding to first engaged thread 1 of FIG. 5, shows fracture at the low end of the life cycle curves while the point $n$, corresponding to the $n$th thread in FIG. 5, indicates fracture at the high end of the life cycle curves. This correlates well with the findings that in normal nut and bolt combinations under such conditions fracture occurs most commonly in the bolt at its first engaged thread.

A nut configuration of optimum fatigue resistant characteristics would be one that makes failure of the bolt due to fatigue equally likely at all points along the engagement of the thread or, stated conversely, equally unlikely at any given thread. In a normal nut and bolt combination the tensile force $P_k$ in the bolt at thread $k$ decreases from the first engaged thread 1 of FIG. 5 to the last or $n$th thread. The stress due to this force will likewise decrease as the $n$th thread is approached. The load transfer intensity $F_k$ represents the proportion of the bolt load P which is transferred to the nut at the $k$th thread, and in a normal nut and bolt combination this, too, decreases from the first to the $n$th thread. If however, the load transfer intensity can be made to vary inversely to $P_k$, as in FIG. 9, it would be possible for the increasing load transfer intensity to compensate for the decreasing tensile force $P_k$ so that all threads would have total stresses of equal magnitude. Thus, all the threads 1, 2, 3 . . . $n$ would be located on the same life cycle curve and have equal fatigue life.

An approximation to such an inverse load transfer intensity is produced by the configuration incorporated in the nut 10, FIG. 1 having two adjacent, axially spaced, internally threaded sections 16 and 18 and connecting web 20. Web 20 is set off from the outer periphery of the nut by recess 22 and from its inner periphery by groove 24. Both recesses and grooves may be employed as shown in FIGS. 1 and 7 or they may be staggered as shown in FIG. 6; they may be employed separately using either a recess or a groove.

The first engaged or lower section 18 contains internal threads 26 which during manufacture are displaced apart and out of phase with internal threads 28 of upper section 16. With nut 10 secured lightly against plate 14 on bolt 12, bolt thread 30 will have its leading faces 32 engaging the lagging faces 34 of upper section threads 28 in the normal manner of engagement, while its lagging faces 38 will engage leading faces 36 of lower section threads 26, in reverse of the normal manner of engagement.

One manner of displacing threads 28 apart and out of phase with respect to threads 26 is to rotate either section 16 or 18 relative to the other through an angle beyond the elastic limit of the web material so that when the rotating force is released, sections 16 and 18 will remain permanently rotated and out of phase. This results in an effective axial displacement apart of threads 26 and 28 without relative axial movement of sections 16 and 18. Displacement of threads 28 apart and out of phase with respect to threads 26 can be accomplished in other ways such as by actually displacing sections 16 and 18 apart permanently in an axial direction relative to each other.

If the nut threads are displaced out of phase by permanently rotating the sections 16 and 18 relative to each other, the outer surface of the upper section 16 could be made cylindrical in shape with a diameter sufficiently small so that it would not interfere with a wrench or other turning means used to tighten the nut by engaging the outer surface of the lower section 18. Avoidance of interference in the wrenching process due to rotational misalignment of the two sections of the nut may also be accomplished by twisting the sections, then threading them and twisting them back to their original relation, leaving the threads displaced but the outer portions of the nut aligned.

The threads 28 must be displaced apart and out of phase with threads 26 by a distance which is greater than either the axial thread clearance, the axial distance left between mating threads to allow ease of assembly, or the yield displacement $s_y$ of the web shown in FIG. 11 but less than the axial thread clearance plus one half the thread pitch 90; the thread clearance is shown in FIG. 1 as the space 40 between threads 30 and 28. If the threads' phasing is displaced by this distance, upper section nut threads 28 will engage bolt threads 30 on the opposite faces from lower section nut threads 26 in the manner shown in FIG. 1. When a nut is designed without a groove 24, the threads of its adjacent sections will be continuous and the correct phase displacement will occur gradually across the portion of the threads between the sections separated by the recess 22.

In displacing the threads of adjacent sections apart and out of phase with each other, the actual separation between the sections can amount to many times the pitch without adversely affecting the desired thread relation, so long as the threads are finally out of phase by more than either the thread clearance or the yield displacement of the web and less than the thread clearance plus one half of the thread pitch.

In FIG. 2, where load P, less than $L_y$, is acting on bolt 12 and corresponding compressive load P is exerted on nut 10, the threads 26, 28 and 30 are in the same relation as in FIG. 1, described above, since the web 20 is loaded in the elastic region. Web loads within the elastic region (the region including the loads to which a material may be subjected and still be able to return to its original form upon removal of the load) are on the steep portion of the curve in FIG. 11, where a substantial increase in load L applied to the web will cause only a slight decrease in the length of the web. When the load L on the web 20 reaches a value $L_y$, the yield point (the point at which deformation first increases markedly with little increase in applied load), there can be a substantial decrease in the length of web 20 with only a slight increase in the load L. When P is increased beyond $L_y$ the contact pressure between thre lower section nut thread leading faces 36 and bolt thread lagging faces 38 will decrease and when P is sufficiently larger than $L_y$ the web 20 will decrease in length enough by plastic (permanent) deformation so that the thread faces 36 and 38 will disengage and there will exist the transitional loading condition shown in FIG. 3 where only the upper section nut threads 28 are in contact with the bolt threads 30. As the bolt load P is increased further there is further plastic deformation of the web 20 until the end of the transitional region is reached at point $a$ in FIG. 11 at which point the load $P=P_a=L_a$ is such that the lower section nut thread lagging faces 38 have come in contact with the bolt thread leading faces 32 and the relationship of the threads shown in FIG. 4 prevails; at this point the lower section nut threads 26 transfer substantially none of the bolt load.

As the load P on the bolt is increased beyond $L_a$ the additional load is carried primarily by the nut threads 26 in the lower section 18. This condition results from the fact that any substantial increase in the load carried by the nut threads 28 in the upper section 16 and thus by the web 20, would require a large increase in the compression of the web 20 and this compression could not take place unless the nut threads 26 in the lower section 18 or the mating bolt threads deformed plastically or sheared due to transfer of load. Assuming the threads are properly designed so that such plastic deformation or shearing of threads does not take place, it is clear that most of the load beyond $L_a$ is taken up by the threads 26 of the lower section 18 of the nut. Thus, when there is a load $P=P_b$ acting on the bolt, where $P_b$ is greater than $L_a$, the web 20 will be in the condition indicated by the point $b$ in FIG. 11 where the load $L_b$ carried by the web 20 is less than $P_b$ by the amount of load carried by the lower section threads 26.

If now the load on the bolt is reduced from $P_b$ to zero, during this unloading process the web 20 will move from the condition $b$ to the condition $c$ in FIG. 11. The path $bc$ will be an elastic unloading. If now the load on the bolt is again raised to its formed value $P_b$ the web 20 moves along the path $cb$ and reaches the condition $b$ where the threads in the upper portion 16 once again carry the same load $L_b$ as was carried previously. The path $cb$ is an elastic loading path. All subsequent unloading and loading of the bolt, typical of fatigue loading, will be accomplished with elastic action of the web 20 so long as the maximum load on the bolt does not exceed the value $P_b$. If load P later exceeds its previous maximum $P_b$ a slight plastic deformation of web 20 similar to that occurring during the original loading from point $a$ to point $b$ would take place during this increase in bolt load. Web 20 will now behave elastically under all future bolt unloadings and loadings which do not exceed this new maximum value of P.

Figure 13:
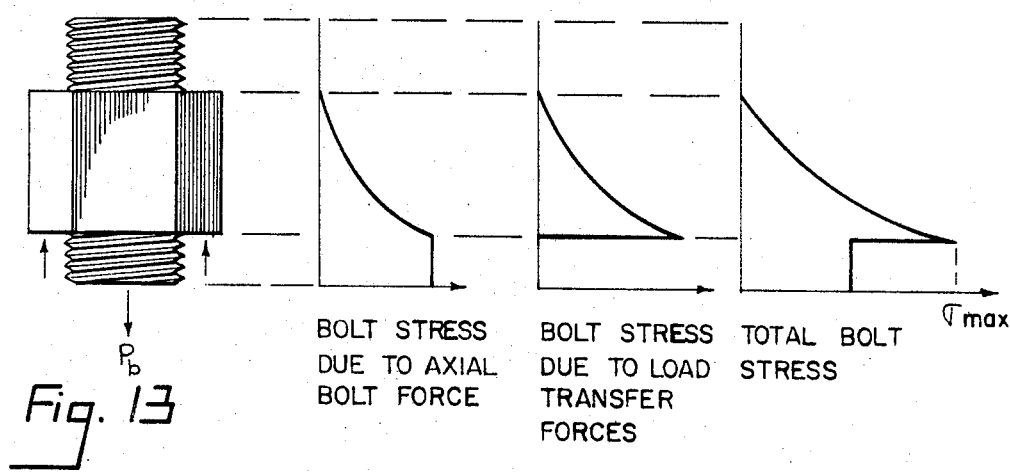
FIG. 13 is a diagram similar to that of FIG. 12, but illustrating bolt stress when a normal nut is used.

The area of the web 20 is made such that when the maximum load $P_b$ is acting on the bolt the load $L_b$ carried by the web is such that the stress in the bolt due to both axial tensile force and load transfer intensity has the same maximum value in the first bolt thread engaged by the lower nut section 18 and the first bolt thread engaged by the upper nut section 16. This design condition is illustrated in FIG. 12. For comparison there is illustrated in FIG. 13 the stress distribution in a bolt engaged by an ordinary nut and carrying the same load as the bolt in FIG. 12.

Because the threads of the two nut sections are spaced apart out of phase a distance greater than either the maximum axial thread clearance to be encountered in practice or the yield displacement of the web 20, the exact tolerance with which either the bolt or nut is made is not important since when the thread relationship shown in FIG. 4 is reached it is certain that the web has undergone plastic deformation and the load in the web is close to the design load $L_p$. Thus, because of the design dependence upon plastic deformation of the web the nut automatically fits itself to each bolt to produce a stress distribution in the bolt which will vary from the ideal shown in FIG. 12 only by a small amount for rather large variations in the tolerance with which the bolts or nuts are made. In contrast, if the nut sections were displaced apart only enough so that the web was intended to act elastically then small differences in tolerances would have substantial differences on the load carried by the web and hence, on the stress distribution in the bolt.

Figure 14:
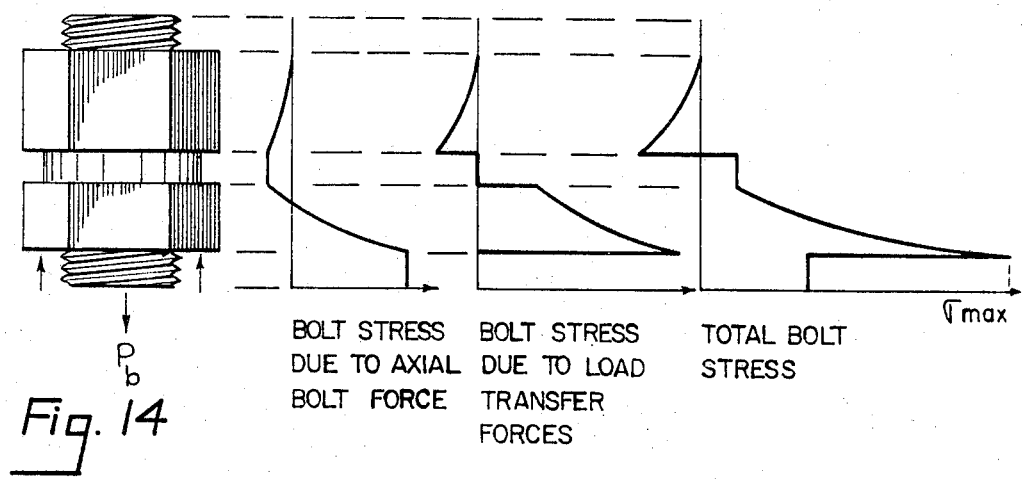
FIG. 14 is a diagram similar to those of FIGS. 12 and 13, illustrating the bolt stress when a nut is used that has its threads displaced out of phase toward each other.

It is of importance to note that if the two nut sections were spaced together out of phase, e.g. if the web 20 were compressed permanently after the threads had been formed in the two sections of the nut, then the maximum stress in a bolt supported by such a nut would be greater than the maximum stress in a bolt supported by an ordinary nut. This is shown in FIG. 14 which illustrates the case where a portion of the bolt within the nut continues to experience an axial compressive force even when the bolt is loaded with a tensile force.

Other nut designs which will deliver a desirable load transfer distribution are shown in FIGS. 6 and 7. Nut 42 of FIG. 6 contains four adjacent, axially spaced internally threaded sections 44, 46, 48 and 50 connected by webs 52, 54 and 56 which decreases in thickness from bottom to top, having internal grooves 58, 60 and 62, and external recesses 64 and 66, and which deform in shear parallel to the axis of the nut in the manner illustrated in FIG. 11. In this construction the threads in each of the sections 44, 46, 48 and 50 are displaced apart and out of phase with the threads of the adjacent sections by an amount which is more than either the axial thread clearance or the yield displacement of the intervening web and less than the axial thread clearance plus one half of the thread pitch. The nut 68 of FIG. 7 is similar to that of FIG. 6 except that the internal grooves 70, 72 and 74 are in line with external recesses 76, 78 and 80. Webs 86, 84 and 82 decrease in thickness, web 86 being thicker than web 84 and web 84 being thicker than web 82. This variation in web thickness in the nuts of FIGS. 6 and 7 produces a closer approximation to the ideal load transfer distribution and insures that the webs which are screwed on a bolt after a preceding web or webs will having successively lower yield points and will not force plastic deformation of those preceding webs.

Other embodiments will occur to those skilled in the art and are within the following claims.

What is claimed is:

1. A fatigue resistant nut for engagement with a threaded member comprising:
   at least two adjacent, axially spaced, internally threaded sections of substantially identical thread formation connected by an integrally formed web;
   said web defining an annular portion having an inner diameter at least as great as the root diameter of the thread with the radial thickness of said web being less than the radial thickness of the threaded sections from the roots of the threads to the external surfaces of said sections;
   the area of said web being such that the area times the yield stress will be such that the web will deform plastically when said nut is threaded on said member and said member is subjected to load; and the threads of one of said sections being displaced apart from and out of phase with the threads of the adjacent said section by more than either the axial thread clearance or the yield displacement of said web but less than said axial thread clearance plus one-half of the thread pitch.

2. The nut of claim 1 wherein the internally threaded sections include a first and second section.

3. The nut of claim 2 wherein:

the first engaged section's threads are in reverse load transferring relation with the threads of said member and the second section's threads are in normal load transferring relation with said member's threads when the load on said member is less than the elastic limit load of said web; said first engaged section's threads changing from a reverse load transferring relation to a normal load transferring relation with said member's threads as the load on said member is increased through the transitional region of the plastic region of said web and said web undergoes plastic deformation; and said first engaged section's threads and said second section's threads are in normal load transferring relation with said members's threads as the load on said member is increased to a predetermined maximum load beyond said transitional region of said plastic region of said web;

said first engaged section's threads and said second section's threads remaining in normal load transferring relation with said member's threads thereafter, and said web responding elastically to repeated unloading and reloading of said member not exceeding said previous maximum loading.

4. The nut of claim 2 in which:

the leading faces of said first engaged section's threads initially engage the lagging faces of said member's threads and the lagging faces of said second section's threads initially engage the leading faces of said member's threads; said web being plastically deformable so that as said member is loaded the lagging faces of said first engaged section's threads also engage the leading faces of said member's threads; said lagging faces of said first engaged section's threads and of said second section's threads engaging said leading faces of said member's threads thereafter, the total stress in said member being substantially equal at the first thread engaged by each of said threaded sections, and said web responding elastically to subsequent unloadings and reloadings of said member.

5. The nut of claim 1 wherein the threaded sections comprise a plurality of threaded sections, each pair connected by an integrally formed web, each of said section's threads being displaced apart and out of phase with the threads of its adjacent sections by more than either the axial thread clearance or the yield displacement of said web and less than the said axial thread clearance plus one half of the thread pitch.

6. The nut of claim 5 in which:

under initial loading with said member said first engaged section's threads are in reverse load transferring relation with the threads of said member and said other sections' threads are in normal load transferring relation with said member's threads, under loads less than the elastic limit of the first web connecting said first engaged section with the next adjacent section; said first engaged section's threads change from a reverse load transferring relation to an intermediate load transferring relation with said members threads as the load on said member is increased through the transitional region of the plastic region of said first web and said first web undergoes plastic deformation; and said first engaged section's threads and said other sections' threads are in normal load transferring relation with said member's threads as the load on said member is increased to a predetermined maximum load beyond said transitional region of said plastic region of said first web;

said first engaged section's threads and said other sections' threads remaining in normal load transferring relation with said member's threads thereafter, and said first web responding elastically to repeated unloading and reloading of said member not exceeding said previous maximum loading.

7. The nut of claim 5 in which:

the leading faces of said first engaged section's threads initially engage the lagging faces of said member's threads and the lagging face of said other sections' threads initially engage the leading faces of said member's threads; said first web being plastically deformable so that as said member is loaded the lagging faces of said first engaged section's threads also engage the leading faces of said member's threads; said lagging faces of said first engaged section's threads and of said other sections' threads engaging said leading faces of said member's threads thereafter, the total stress in said member being substantially equal at the first thread engaged by each of said threaded sections, and said first web responding elastically to subsequent unloadings and reloadings of said member.

8. The nut of claim 5 wherein each succeeding web is designed to yield plastically in succession as the load on said member is increased to a predetermined maximum load.

9. The nut of claim 8 which includes four threaded sections and first, second and third webs joining said sections, the third web designed to yield plastically prior to the second web yielding and the second web designed to yield plastically prior to the first web yielding and the first web yields plastically in succession as the load on said member is increased to a predetermined maximum load.

10. The nut of claim 1 in which the threads of adjacent sections are displaced apart and out of phase by exceeding the elastic limit of the material of the nut.

References Cited

FOREIGN PATENTS 853,081  10/1952  Germany.

CARL W. TOMLIN, *Primary Examiner.*

R. S. BRITTS, *Assistant Examiner.*

UNITED STATES PATENT OFFICE
CERTIFICATE OF CORRECTION

Patent No. 3,385,339

May 28, 1968

Norman Christian Dahl

It is certified that error appears in the above identified patent and that said Letters Patent are hereby corrected as shown below:

In the drawings, Fig. 1, the pitch of the bolt threads should be indicated by reference lines extending from a pair of adjacent thread crests having a double-headed arrow therebetween, and the pitch should be identified by reference numeral 90 having a lead line extending to the arrow. Fig. 10, "$c_x$" should read -- $c_n$ --, "$c_2$" should read -- $c_x$ --, "$c_1$" should read -- $c_2$ --, and a parenthesis should appear after "stress". Fig. 11, "transitional area" should be -- transitional region --, "$L_p$" should read -- $L_b$ --, "$L_u$" should read -- $L_a$ --, a dotted line should extend perpendicularly upwardly from the Compression of Web axis to the end of the dotted line representing the yield point load $L_y$, and $\sigma y$ should identify the point at which the perpendicular dotted line intersects the compression of Web axis. A bracket should also appear between points "b" and "c" on the graph along with the statement -- elastic behavior upon unloading from b and reloading to b --.

Signed and sealed this 13th day of January 1970.

(SEAL)
Attest:

EDWARD M. FLETCHER, JR.
Attesting Officer

WILLIAM E. SCHUYLER, JR.
Commissioner of Patents